United States Patent [19]

Reed et al.

[11] Patent Number: 5,141,637

[45] Date of Patent: Aug. 25, 1992

[54] FILTER UNITS WITH END CONNECTORS

[75] Inventors: Clayton L. Reed, Cortland; James T. Connors, Jr., Groton, both of N.Y.

[73] Assignee: Pall Corporation, Glen Cove, N.Y.

[21] Appl. No.: 620,060

[22] Filed: Nov. 30, 1990

[51] Int. Cl.⁵ .......................................... B01D 25/02
[52] U.S. Cl. .................................. 210/232; 210/323.2; 210/450; 210/458; 210/DIG. 17; 55/484; 55/502
[58] Field of Search ................. 55/484, 502; 210/232, 210/253, 323.2, 340, 437, 446, 448, 450, 457, 458, DIG. 17

[56] References Cited

U.S. PATENT DOCUMENTS

| | | |
|---|---|---|
| Re. 29,447 | 10/1977 | Farrow et al. . |
| 477,796 | 6/1892 | Fleming . |
| 2,593,227 | 4/1952 | Wagner . |
| 2,868,383 | 1/1959 | Nicolls . |
| 3,246,920 | 4/1966 | Pall . |
| 3,300,049 | 1/1967 | Hardcastle . |
| 3,344,923 | 10/1967 | Pall et al. . |
| 3,481,472 | 12/1969 | Petri . |
| 3,503,511 | 9/1967 | Spitzberg . |
| 3,868,325 | 2/1975 | Otto ............................. 210/446 |
| 3,957,644 | 5/1976 | Edmondson ................. 210/448 |
| 3,986,960 | 10/1976 | Wire et al. . |
| 3,993,561 | 11/1976 | Swearingen ................. 210/446 |
| 4,052,307 | 10/1977 | Humbert, Jr. . |
| 4,071,444 | 1/1978 | Ash et al. . |
| 4,105,562 | 8/1978 | Kaplan et al. . |
| 4,170,556 | 10/1979 | Pall ............................. 210/437 |
| 4,176,815 | 12/1979 | Davidson et al. . |
| 4,228,012 | 10/1980 | Pall . |
| 4,237,010 | 12/1980 | Zimmerly . |
| 4,259,097 | 3/1981 | Patel et al. . |
| 4,336,043 | 6/1982 | Aonuna et al. ............. 210/323.2 |
| 4,421,170 | 12/1983 | Swift, Jr. et al. .......... 210/323.2 |
| 4,422,790 | 12/1983 | Gebert et al. . |
| 4,451,369 | 5/1984 | Sekino et al. . |
| 4,473,471 | 9/1984 | Robichaud et al. . |
| 4,517,085 | 5/1985 | Driscoll et al. . |
| 4,559,138 | 12/1985 | Harms, II ................... 210/493.1 |
| 4,609,465 | 9/1986 | Miller ......................... 210/323.2 |
| 4,670,145 | 6/1987 | Edwards . |
| 4,707,262 | 11/1987 | Murken ...................... 210/448 |
| 4,735,716 | 4/1988 | Petrucci et al. . |
| 4,740,299 | 4/1988 | Popoff et al. . |
| 4,759,845 | 7/1988 | Selesnick . |
| 4,802,979 | 2/1989 | Medley, III . |
| 4,810,379 | 3/1989 | Barrington .................. 210/232 |
| 4,855,046 | 8/1989 | Meehan . |
| 4,871,455 | 10/1989 | Terhune et al. ............ 210/DIG. 17 |
| 4,881,313 | 11/1989 | Artinyan et al. . |

FOREIGN PATENT DOCUMENTS

| | | |
|---|---|---|
| 616962 | 3/1961 | Canada . |
| 2126366 | 12/1972 | Fed. Rep. of Germany . |
| 3921369 | 1/1990 | Fed. Rep. of Germany . |
| 56-37853 | 9/1981 | Japan . |
| 306723 | 12/1968 | Sweden . |

Primary Examiner—Robert A. Dawson
Assistant Examiner—Wanda L. Millard
Attorney, Agent, or Firm—Leydig, Voit & Mayer

[57] ABSTRACT

An end connector system for connecting a plurality of filter units in series has first and second end connectors secured to the ends of filter units. Each end connector has a base with a sealing surface and a connecting portion for engagement with the connecting portion of another end connector. The connecting portions have overlapping surfaces that overlap in the radial direction of the bases when the connecting portions are engaged with one another. A seal member is disposed between the first and second end connectors and is pressed into sealing contact with the sealing surfaces of the bases by a compression-generating member such as a tie rod. When the sealing surfaces are in sealing contact with the seal member, the overlapping surfaces of the connecting portions are separated from one another. As a result, all forces for producing a liquid-tight seal between the end connectors are generated by the compression-generating member and not by the end connectors themselves.

25 Claims, 9 Drawing Sheets

FILTER UNITS WITH END CONNECTORS

TECHNICAL FIELD OF THE INVENTION

This invention relatives to filter units having end connectors for connecting a plurality of filter units end to end in series so that the filter units can be conveniently installed in and removed from a filter housing.

BACKGROUND OF THE INVENTION

In many filtration systems, filter units are disposed inside a filter housing that defines the flow path into and out of the filter units. In some applications, the filter housing can be very deep. Although it is possible to manufacture a single filter unit having a length corresponding to the depth of the filter housing, such a filter unit would require different manufacturing processes or equipment for each specific length of filter unit manufactured. Therefore, filtration systems commonly employ a modular concept in which a plurality of short filter units are manufactured and then connected end to end at the time of installation to form a stack of filter units having the necessary length. The stack is referred to by the number of filter units it contains. For example, a stack of two, three, or four filter units connected together in this manner is called a twohigh, a three-high, or a four-high stack. Some filter housings may require only a single filter unit, which may then be referred to as a one-high stack. The modular concept is popular among filter manufacturers because it reduces the number of different lengths of filter units that need to be manufactured and kept in inventory.

When a plurality of filter units are connected together in a stack, it is necessary to form a fluid-tight seal between adjacent filter units. Various arrangements have been proposed in the past for connecting the filter units of a stack so as to obtain a fluid tight seal. In some arrangements, adjoining filter units are welded together. In other arrangements, adjoining filter units in a stack are mechanically connected by separate coupling members, each being individually connected to the end cap of each filter unit. Such connections rely on the strength of the coupling members to form a fluid-tight seal between the filter units, which results in the coupling members and the end caps of the filter units being undesirably heavy. Furthermore, since a fluid-tight fit is attained between the filter units by the coupling members, the dimensions of the coupling members and the end caps must be extremely accurate. Consequently, they are expensive to manufacture. The need for separate coupling members and end caps also increases manufacturing and installation costs. In addition, the coupling members may protrude into the path of fluid flow through the filters and increase the resistance to flow.

SUMMARY OF THE INVENTION

Accordingly, it is an object of the present invention to provide a filter unit having an end connector that is reliable, lightweight, and inexpensive to manufacture.

It is another object of the present invention to provide filter units employing connecting members that can also serve as end caps of the filter units being connected.

It is yet another object of the present invention to provide filter units having end connectors that can be coupled and uncoupled by hand.

Accordingly, the present invention provides a filter unit comprising a filter element and first at and second end connectors respectively positioned the first and second ends of the filter element. Each end connector includes a sealing surface and a connecting portion which has a latch member. The filter unit further comprises a seal positioned at the sealing surface of at least one of the first and second end connectors. The first end connector can be connected to a second end connector of an identical filter unit by an engagement of the connecting portions of the end connectors in which the latch members overlap in a radial direction. The first and second end connectors are arranged such that contact between the latch members applies insufficient force on the seal to provide a fluidtight connection between the filter units.

The present invention further provides a filter system comprising a first filter unit and a second filter unit. Each filter unit has an end connector which includes a sealing surface and a connecting portion having a latch member. The end connector of the second filter unit is connected to the end connector of the first filter unit by an engagement of the connecting portions in which the latch members overlap in a radial direction. The filter system further comprises a seal positioned between the sealing surfaces of the first and second end connectors. Contact between the latch members of the first and second end connectors applies insufficient force against the seal to provide a fluid-tight connection between the filter units. Consequently, the filter system further comprises a compression-generating member coupled to the filter units. The compression-generating member is arranged to press the sealing surfaces of the first and second end connectors into sealing contact with the seal member.

In structures embodying the invention, of the forces for producing a fluid-tight seal between the end connectors are preferably generated solely by the compression-generating member and not by the end connectors themselves. Furthermore, the forces acting on the end connectors to produce sealing are compressive forces acting normal to the bases of the end connectors rather than bending or shear forces. Therefore, the structure of the end connectors can be extremely light. In addition, the fit between the end connectors is not critical for obtaining a fluid-tight seal between end connectors, so the end connectors can be inexpensively manufactured.

In preferred embodiments, the end connectors of the filter unit are secured to the ends of filter elements and serve as end caps for the filter elements. Further, the filter unit preferably includes two seals, one positioned at the sealing surface of each end connector. The filter unit is thus fully equipped and ready for immediate installation in the filter housing, whether the filter housing requires a one-high stack or a multihigh stack.

DESCRIPTION OF THE PREFERRED EMBODIMENTS

Figure 1:
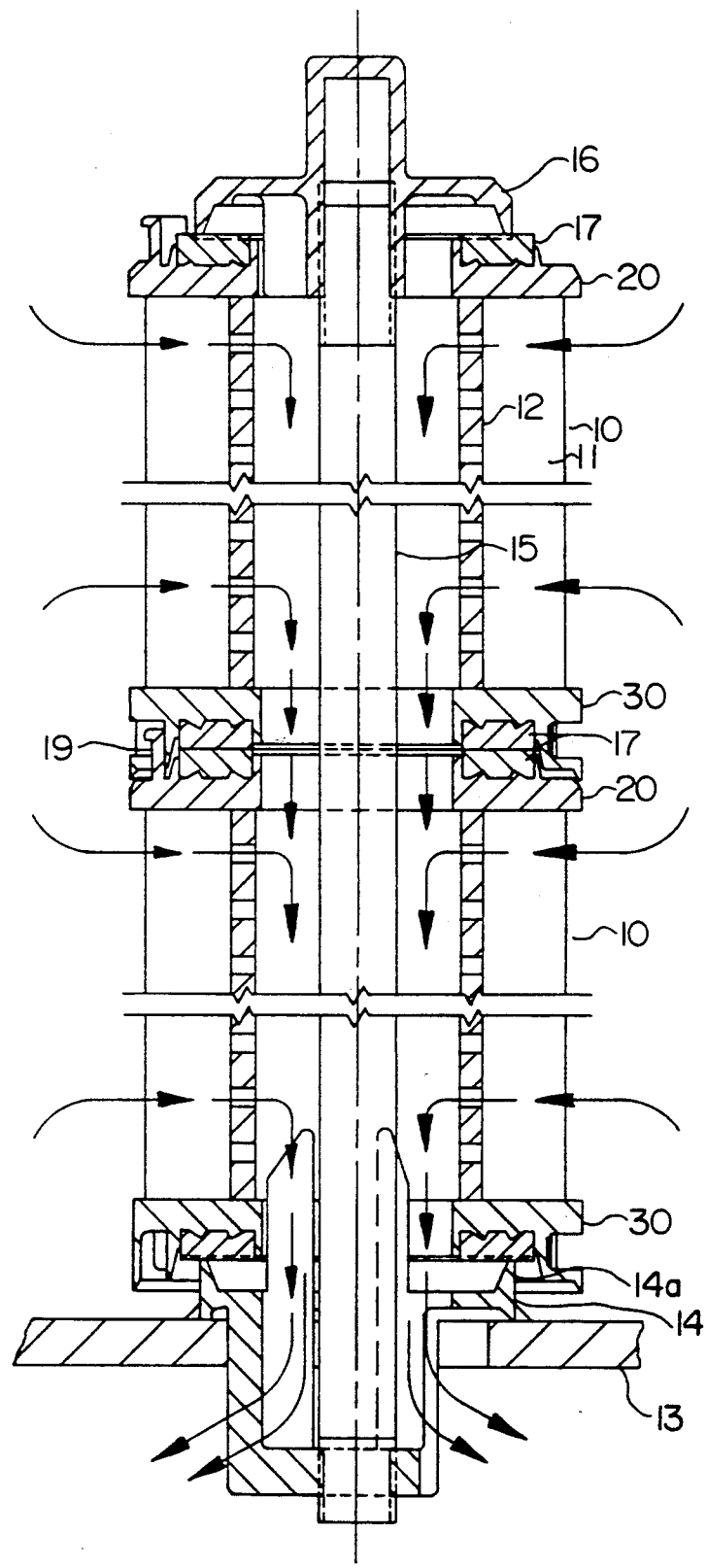
FIG. 1 is a longitudinal cross-sectional view of a first embodiment of a filter system comprising two filter units connected end to end.

FIG. 1 is a longitudinal cross-sectional view of a first embodiment of a filter system according to the present invention. As shown in this figure, two conventional filter units 10 are connected end to end and mounted on a support 13 of an unillustrated fluid system. Fluid to be filtered can flow inside-out or, as illustrated, outside-in through the filter units 10. For outside-in flow, each filter unit 10 may include a cylindrical perforated core 12 and a filter element 11, such as a pleated element, mounted on the core 12. Alternatively, other types of filter elements, such as a hollow, cylindrical mass of fibers, can be employed.

In the illustrated embodiment, a male end connector 20 and a female end connector 30 are secured to opposite ends of each filter element 11 and function as end caps for the filter elements 11. The female end connector 30 of the upper filter unit 10 in FIG. 1 mates with the male end connector 20 of the lower filter unit 10. Each end connector 20, 30 is equipped with a seal member, such as a flat gasket 17. Alternatively, the seal member may be any member which forms a fluid-tight seal between adjoining end connectors, including, for example, a packing or an O-ring.

The seal members of mating connectors 20, 30 are pressed into sealing contact with each other and with the end connectors 20, 30 by a compression-generating member, e.g., a tie rod 15 running through the center of the hollow cores 12 of the two filter units 10. The tie rod 15 has threads formed on its opposite ends. A seal nut 16 screws onto the upper end of the tie rod 15 and exerts a compressive force on the gasket 17 of the male end connector 20 of the upper filter unit 10. The lower end of the tie rod 15 screws into or can be permanently attached to an adaptor 14 that is secured to the base 13. The adaptor 14 has a circumferential ridge 14a that supports and is pressed tightly against the gasket 17 of the female end connector 30 of the lower filter unit 10.

Figure 2:
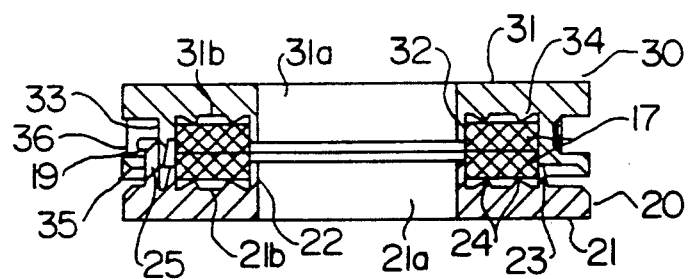
FIG. 2 is a cross-sectional view of two mated end connectors of the embodiment of FIG. 1.
Figure 3:
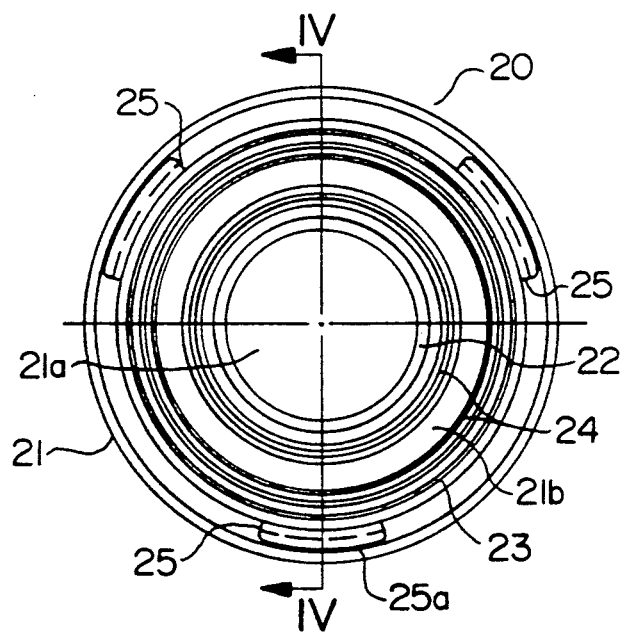
FIG. 3 is a plan view of the male end connector of FIG. 2.
Figure 4:
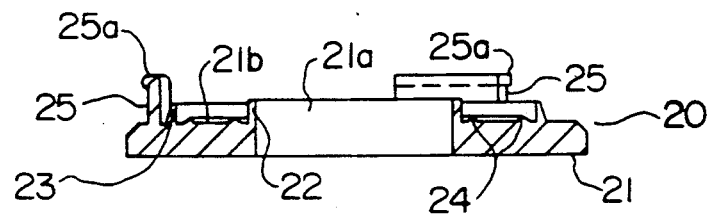
FIG. 4 is a cross-sectional view taken along Line IV—IV of FIG. 3.

FIG. 2 is a cross-sectional view of the two mating connectors 20, 30 of the embodiment of FIG. 1, FIG. 3 is a plan view of the male end connector 20 of FIG. 2, and FIG. 4 is a cross-sectional view taken along Line IV—IV of FIG. 3. As shown in these figures, the male end connector 20 has an annular, disk-shaped base 21 with a hole 21a at its center that serves as a port for fluid flow. A cylindrical inner wall 22 surrounding the central hole 21a and a cylindrical outer wall 23 disposed radially outward from the inner wall 22 extend upwards from the upper surface of the base 21 in FIG. 2. The space between the inner and outer walls 22, 23 defines a compartment for a flat, annular gasket 17. The upper surface of the base 21 between the two walls 22, 23 defines a sealing surface 21b against which the gasket 17 is compressed to form a fluid-tight seal. A plurality of circular ridges 24 project sharply upwards from the sealing surface 21b of the base 21 to localize and thereby increase the pressure and enhance the seal between the sealing surface 21b and the gasket 17.

A plurality of connecting portions in the form of tangs 25 project upwards from the upper surface of the base 21. The tangs 25 are disposed outside of the outer wall 23 in the radial direction of the base 21. As viewed in plan in FIG. 3, each tang 25 extends in the circumferential direction of the base 21 over an arc of a circle. In this embodiment, there are three tangs 25 equally spaced from one another in the circumferential direction and each tang 25 extends over an arc of 30°. However, the number and spacing of the tangs 25 and the length of each tang 25 in the circumferential direction are not critical and will depend on factors such as the desired strength and flexibility of the tangs 25. A latch member in the form of an overhanging flange 25a is formed on and extends radially outward from the upper end of each tang 25.

The entire male end connector 20 is preferably an integral member and can be formed of any suitable material. In many cases, the male end connector 20 is preferably made of a molded plastic. The male end connector 20, as well as the female end connector 30, preferably also functions as an end cap for the filter element. Consequently, the end connector can be secured to one end of the filter element 11 and the core 12 by any suitable method. For example, the end connector may be integrally joined to the end of the filter element 11 by bonding or welding. The bottom surface of the male end connector 20 in FIG. 2 can even have grooves or recesses (not shown) formed therein for receiving the ends of the filter element 11 and the perforated core 12 and a potting compound or adhesive. Alternatively, the end connectors may function independently of the end caps.

Figure 5:
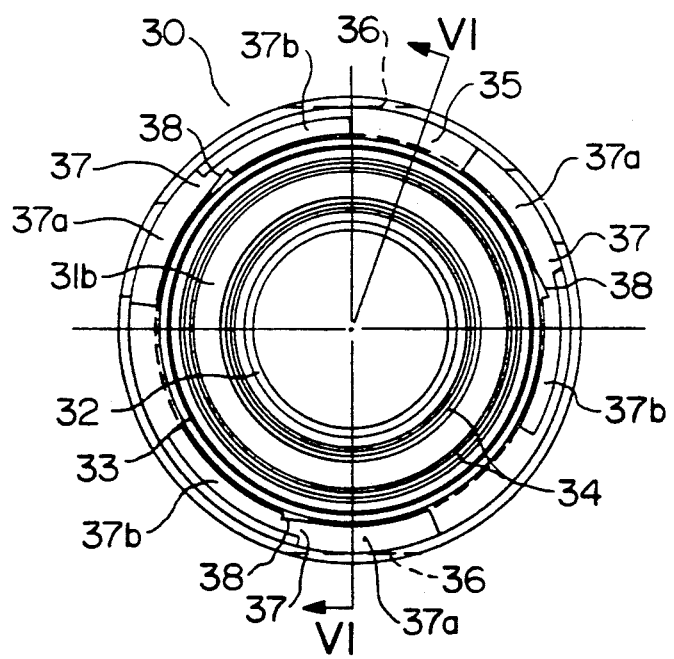
FIG. 5 is a plan view of the female end connector of FIG. 2.
Figure 6:
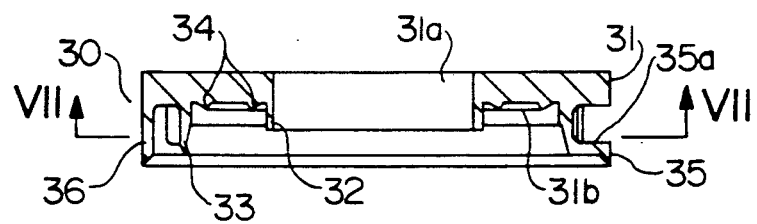
FIG. 6 is a cross-sectional view of FIG. 5.
Figure 7:
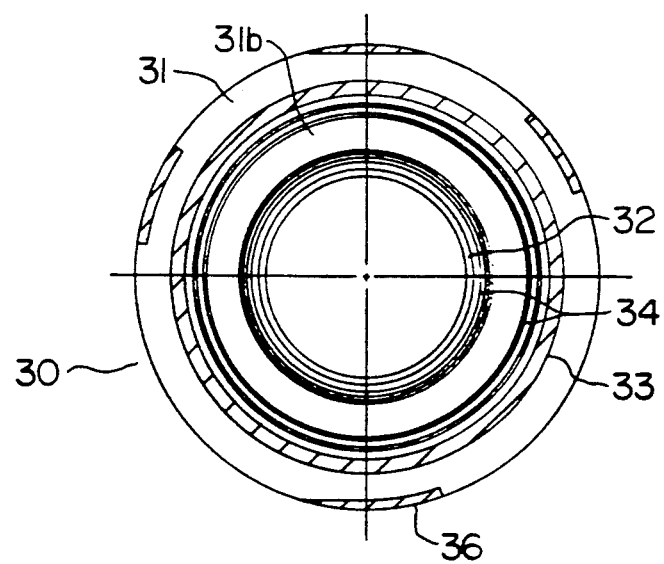
FIG. 7 is a cross-sectional view taken along Line VII—VII of FIG. 6.

FIG. 5 is a plan view of the female end connector 30 of FIG. 2, FIG. 6 is a transverse cross-sectional view of the female end connector 30 taken along Line VI—VI of FIG. 5, and FIG. 7 is a cross-sectional view taken along Line VII—VII of FIG. 6. Like the male end connector 20, the female end connector 30 has an annular, disk-shaped base 31 having a hole 31a at its center that serves as a port for fluid flow. A cylindrical inner wall 32 surrounding the central hole 31a and a cylindrical outer wall 33 disposed radially outward from the inner wall 32 extend perpendicularly from the lower surface of the base 31 in FIG. 6, i.e., the surface facing the male end connector 20 of the adjacent filter unit. The space between the inner and outer walls 32, 33 defines a compartment for a flat, annular gasket 17. The surface of the base 31 between the two walls 32, 33 defines a sealing surface 31b against which the gasket 17 is compressed to form a fluid-tight seal. A plurality of circular ridges 34 project sharply from the sealing surface 31b of the base 31 to increase the pressure and enhance the seal between the sealing surface 31b and the gasket 17.

The female end connector 31 may further include a plate comprising a flat ring 35 having the same outer dimensions as the base 31 but a larger inner diameter. The ring 35 preferably is parallel to and spaced from the base 31 and is rigidly connected to the base 31 by the outer wall 33 and a plurality of pillars 36 extending from the bottom surface of the base 31. As best shown in FIG. 5, the ring 35 has a plurality of circumferentially-extending slots 37 formed therein that serve as connecting portions for connecting the female end connector 30 with the male end connector 20. The slots 37 are equal in number to the tangs 25 of the male end connector 20. Each slot 37 has a first section 37a and a second section 37b adjoining the first section 37a but having a smaller width in the radial direction than the first section 37a. The upper surface of the ring 35 on the radially outer side of the second section 37b of each slot 37 defines a ledge 35a that serves as a latch member for the female end connector 20. The width of each of the first sections 37a is greater than the width of the flanges 25a of the tangs 25 on the male end connector 20 and the radial and circumferential spacing of the first sections 37a corresponds to that of the tangs 25. Consequently, the tangs 25 can be easily inserted into the first sections 37a of the slots 37. The width of the second sections 37b of the slots is greater than the thickness of the upwardly extending portions of the tangs 25 but is less than the width of the flanges 25a. As a result, when the tangs 25 are slid from the first sections 37a into the second sections 37b of the slots 37, the flanges 25a of the tangs 25 overlap ledge of the ring 35 in the radial direction and prevent the male and female connectors 20, 30 from being pulled apart.

To prevent the tangs 25 from being inadvertently rotated from the second sections 37b to the first sections 37a, a detent or lock mechanism may be provided. Although this mechanism can be configured in a variety of ways, the illustrated embodiment includes ramps 38 formed in the slots 37 at the junction of the first and second sections 37a and 37b. The ramps 38 can be shaped so as to merely increase the resistance to circumferential movement by the tangs 25, or they can be shaped so as to completely prevent the movement of the tangs 25 from the second sections 37b of the slots 37 into the first sections 37a. However, the circumferential length of the second section 37b of each slot is preferably greater than the circumferential length of each tang 25 to permit some play between mated end connectors 20, 30.

Like the male end connectors 20, the female end connectors 30 are preferably integral members and can be made of the same materials as the male end connectors 20, such as a molded plastic. Each female end connector 30 preferably functions as an end cap and may be secured to the opposite end of the filter element 11 from the male end connector 20 by any suitable method. For example, the end connector may be integrally joined to the end of the filter element 11 by bonding or welding. Again, the upper surface of the base 12 of the female end connector 10 can even have recesses (not shown) formed therein for receiving the ends of a filter element 11 and filter core 12 and a potting compound or adhesive.

In a preferred mode of operation, two filter units 10 can be joined together by inserting the tangs 25 of a male end connector 20 of one filter unit 10 into the first sections 37a of the slots 37 of a female end connector 30 of another filter unit 10. The bottom surface of the ring 35 of the female end connector 30 is preferably bevelled along its periphery to make it easier to insert the tangs 25 into the slots 37 in the ring 35. When the flanges 25a of the tangs 25 have passed through the first sections 37a, the filter units 10 are then rotated with respect to one another so that the tangs 25 of the male end connector 20 slide circumferentially over the ramps 38 of the female end connector 30 and enter the second sections 37b of the slots 37. In this state, the latch members, i.e., the flanges 25a of the end tangs 25 and the ledge 35a of the ring 35 overlap in the radial direction, so the connectors 20, 30 cannot be detached from one another by axial loads acting on the filter units 10.

Figure 8:
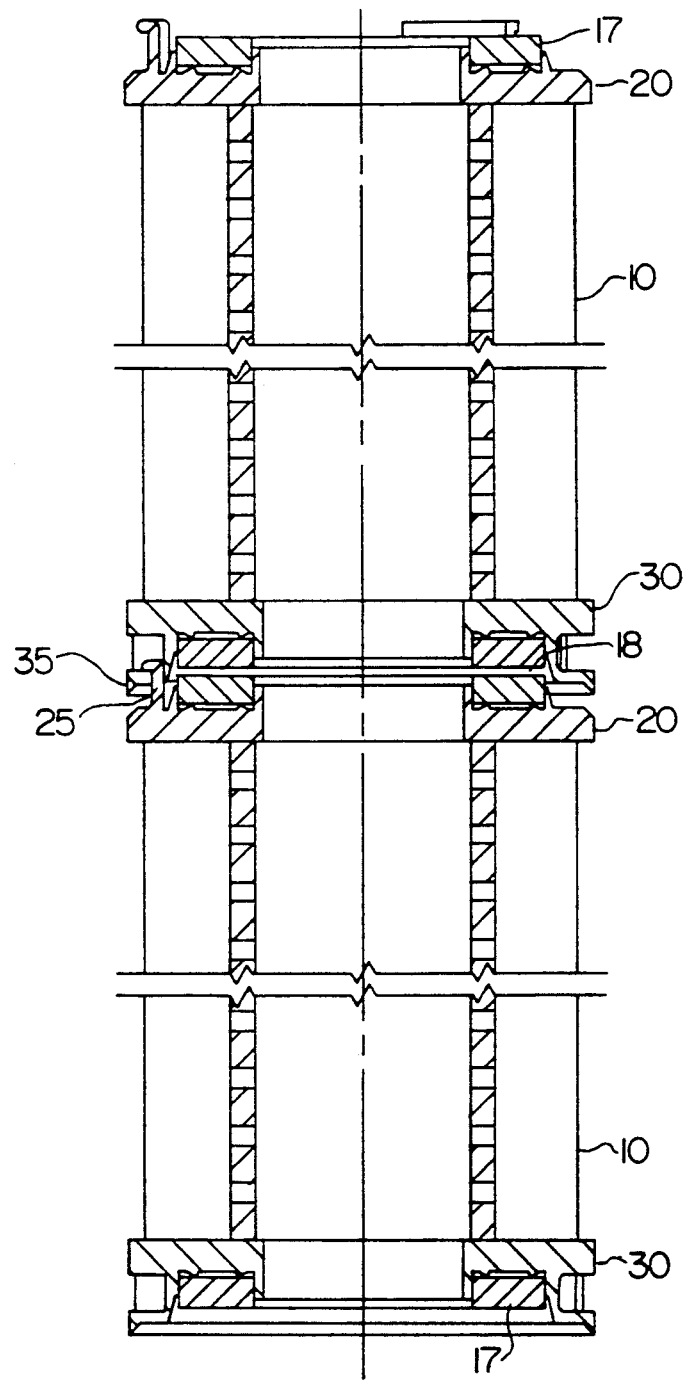
FIG. 8 is a longitudinal cross-sectional view of the two filter units of FIG. 1 before they are compressed by the compression-generating member.

FIG. 8 shows two filter units 10 that have been connected to one another to form a two-high stack but have not been compressed by the compression-generating member. Additional filter units 10 may be connected to produce a three-high, four-high, five-high or even larger stack. The tangs 25, ring 35, and pillars 36 of each end connector 20, 30 are strong enough to support the weight of a plurality of filter units 10, so the entire stack can be lifted from the upper end of the stack without damage to the end connectors 20, 30.

In the state shown in FIG. 8, the tangs 25 of the male end connector 20 of each lower filter unit 10 rest on the flat ring 35 of the female end connector 30 of an adjacent upper filter unit 10. The dimensions of the components of the male and female connectors 20, 30, e.g., the axial length of the tangs 25, flanges 25a, and the pillars 36 and the thickness of the ring 35 and the gaskets 17, may be designed to produce a snug fit between connected filter units 10. While contact between the flanges 25a of the tangs 25 and the ledge of the ring 35 may be sufficient to produce a snug fit, this fit is not sufficient to provide adequate sealing force to form a fluid-tight seal between the gaskets 17 or between the gaskets 17 and the sealing surfaces 21b, 31b. However, a snug fit can provide significant structural rigidity, maintaining the stack of filter units 10 substantially straight and facilitating manipulation of the stack.

Alternatively, the dimensions of the components of the male and female connectors 20, 30 may be designed to produce a loose fit between connected filter units 10. With a loose fit, contact between the flanges 25a of the tangs 25 and the ledge ring 35 would clearly not be sufficient to provide adequate sealing force to form a fluid-tight seal between the gaskets 17 or between the gaskets 17 and the sealing surfaces 21b, 31b. For example, the opposing gaskets 17 of the mated connectors 20, 30 might even be separated by a gap 18. A stack of loose-fitting filter units may have more play between adjoining filter units and, therefore may be more difficult to manipulate than a stack of snugfitting filter units. However, filter units designed for a loose fit may be less expensive to manufacture because the tolerances required for a loose fit are much less stringent than the tolerances required for a snug fit.

Once the filter units 10 have been connected, the stack, e.g., the two-high stack of FIG. 8, can be lowered into a filter housing. A compression-generating member, such as the tie bolt 15, is then installed to exert an axial sealing force on the filter units 10 so as to seal the gaskets 17 of the mated end connectors 20, 30 against each other and against the sealing surfaces 21b, 31b of the end connectors 20, 30. The outer peripheral surface of the outer wall 23 of each male end connector 20 and the inner peripheral surface of the outer wall 33 of each female end connector 30 are preferably bevelled to prevent interference between the two outer walls 23, 33 when the gaskets 17 are compressed by the compression-generating member.

Alternatively, the filter housing may require only a one-high stack, i.e., a single filter unit 10. Once the one-high stack has been fitted in the housing, the compression-generating member can be installed to generate an axial sealing force on the single filter unit. For example, the tie bolt 15 can be inserted through a single filter unit 10 and then threaded to the seal nut 16, sealing the gaskets 17 at the end connectors 20,30 against the adapter 14 and the seal nut 16.

In accordance with the invention, effectively all compressive sealing forces are generated by the compression-generating member and virtually none are generated by the end connectors. A gap 19 may even develop between the radially overlapping surfaces of the flanges 25a of the tangs 25 of each male end connector 20 and the ledge of the ring 35 of the adjoining female end connector 30. Although the compression-generating member of the illustrated embodiment comprises a tie bolt 15 running down the center of the stack and a nut 16 fastened to the bolt 15, other types of compression-generating members may be employed. For example, the compression-generating member may comprise a spring that imposes an axial force along the filter units to seal them against one another. Alternatively, the filter housing itself may serve as the compression-generating member.

Once the filter units 10 have been sealed against one another by the compression-generating member and the filter housing has been secured, fluid, i.e. either a liquid or a gas, may be directed through the stack of filter units. For example, in the illustrated embodiment, the fluid is directed into the housing, radially inward through the filter elements 11 of the filter units 10, through the perforations in the cores 12, and into the hollow centers of the perforated cores 12. Once it is inside the cores 12, the filtrate flows axially along the filter units 10, through the central holes 21a, 31a of the end connectors 20, 30, and through passages formed in the adapter 14. In a preferred embodiment, the diameter of the tie rod 15 is small compared to the inside diameter of the hollow cores 12 through which the filtrate flows, so generally the tie rod 15 does not substantially obstruct flow through the cores 12, especially when the filtrate flow rate is relatively low. However, in cases when the presence of a tie rod 15 inside the center of the cores 12 is objectionable, the tie rod 15 can be replaced by a compression-generating member which does not obstruct flow, such as by a plurality of tie rods mounted external to the filter units 10.

Filter units embodying the invention offer numerous advantages. For example, the sealing force between the gaskets 17 and between the gaskets 17 and the sealing surfaces 21b, 31b is generated by the compression-generating member rather than the end connectors 20, 30 of the filter units 10. Consequently, the sealing force between each filter unit 10 is highly uniform, providing a very reliable seal. Further, because the compression-generating member provides the sealing force, the loads acting on the end connectors 20, 30 are very small. Consequently, there is little likelihood of the tangs 25, pillars 36, or rings 35 breaking, further enhancing the reliability of the connection. Further, these members can have a light-weight structure, reducing the overall weight of the filter unit 10. In addition, the accuracy of the dimensions of the end connectors 20,30 is not critical so they can be easily and inexpensively manufactured.

Figure 9:
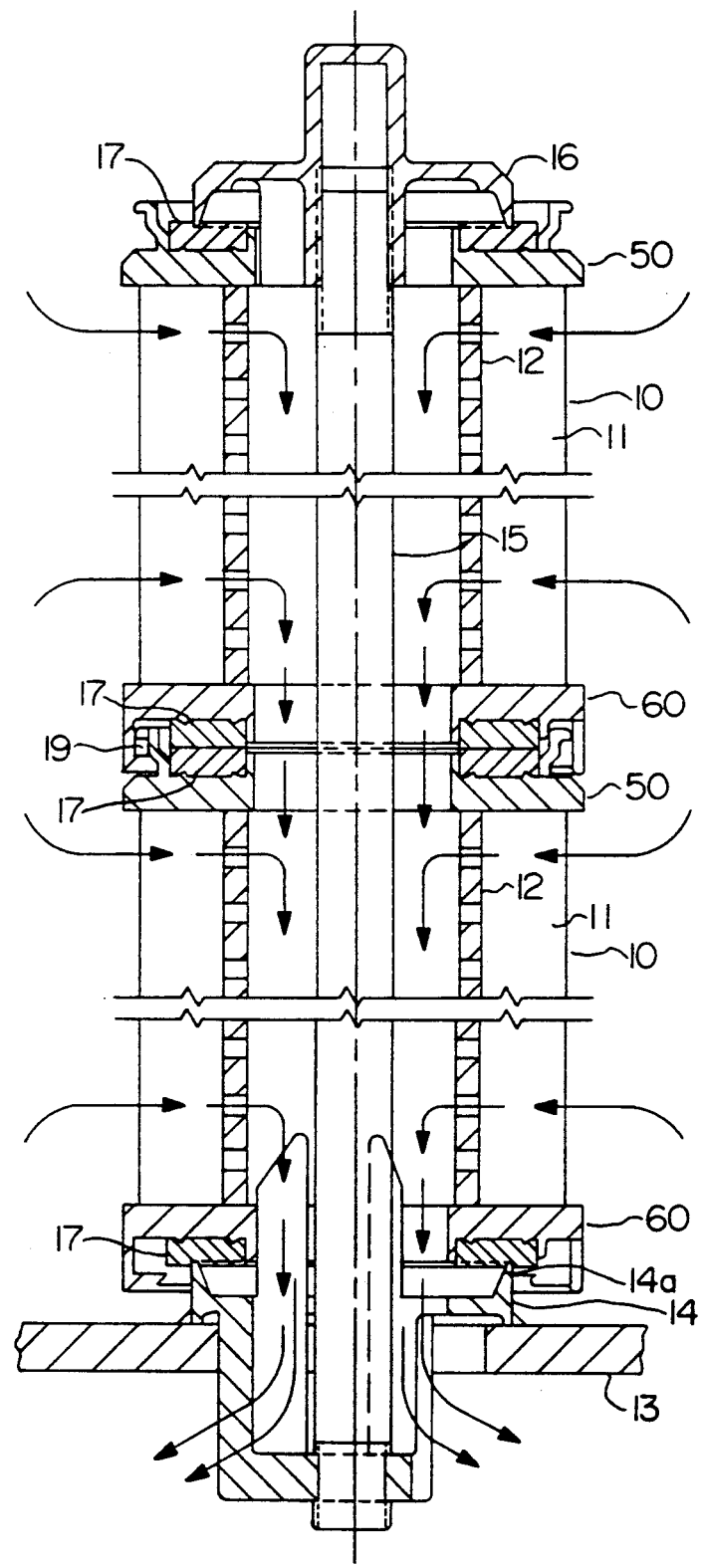
FIG. 9 is a longitudinal cross-sectional view of a second embodiment of a filter system comprising two filter units connected end to end.

Filter units embodying the present invention can have configurations other than those illustrated in the embodiment of FIGS. 1-8. For example, FIGS. 9-15 illustrate a second embodiment of the invention. FIG. 9 is a longitudinal cross-sectional view of a two-high stack of filter units in accordance with a second embodiment of the present invention. As in the embodiment of FIG. 1, two filter units 10 are connected end to end and mounted on a base 13 of an unillustrated filter system. Each filter unit 10 has a male end connector 50 secured to one end and a female end connector 60 secured to its other end, the end connectors 50 and 60 serving as end caps for the filter units 10. The female end connector 60 of the upper filter unit 10 in FIG. 9 engages with the male end connector 50 of the lower filter unit 10 to form the two-high stack. Each end connector 50, 60 is equipped with a seal member in the form of a gasket 17, and the gaskets 17 of mating end connectors are compressed against each other by a compression-generating member, such as a tie rod 15 which extends through the hollow centers of the filter units 10 and a seal nut 16 which is screwed on the upper end of the tie bolt 15. In addition, the compressive force seals the gasket 17 of the male end connector 50 of the upper filter unit 10 against the nut 16 and seals the gasket 17 of the female end connector 60 of the lower filter unit 10 against the circumferential ridge 14a of an adaptor 14 that is secured to the base 13 and receives the lower end of the tie bolt 15.

Figure 10:
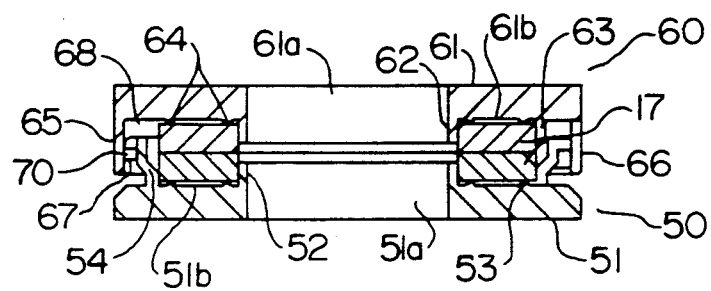
FIG. 10 is a cross-sectional view of two mated end connectors of the embodiment of FIG. 9.
Figure 11:
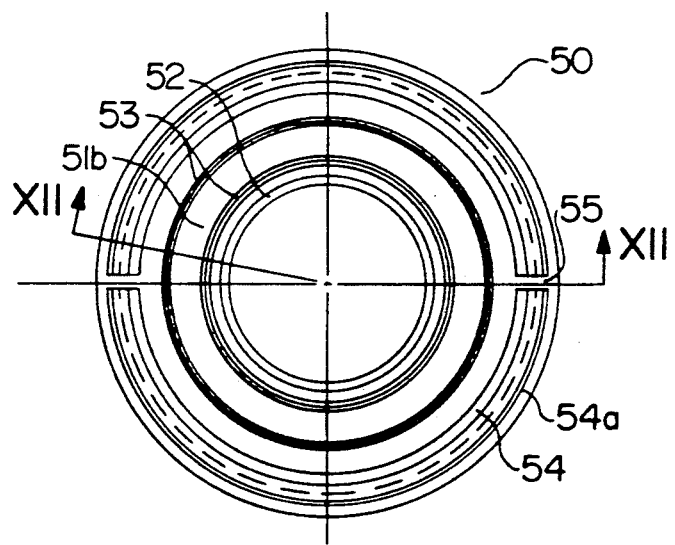
FIG. 11 is a plan view of the male end connector of FIG. 10.
Figure 12:
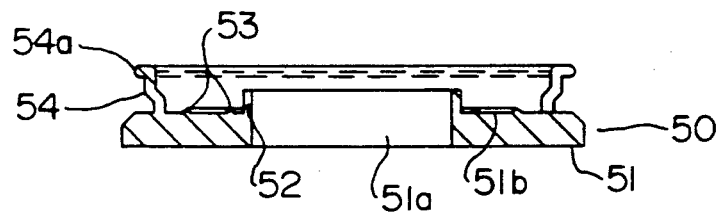
FIG. 12 is a cross-sectional view taken along Line XII—XII of FIG. 11.

The embodiment of FIG. 9 differs from the first embodiment principally with respect to the shape of the connecting portions of the end connectors 50, 60. FIG. 10 is a cross-sectional view of the male end connector 50 and the female end connector 60 of FIG. 9 in a mated state, FIG. 11 is a plan view of the male end connector 50 of FIG. 10, and FIG. 12 is a cross-sectional view of the male end connector 50 of FIG. 11. As shown in these figures, the male end connector 50 has a disk-shaped base 51 with a hole 51a at its center that serves as a port for fluid flow. A cylindrical inner wall 52 surrounding the hole 51a and a connecting portion in the form of arcuate tangs 54 disposed outward from the inner wall 52 in the radial direction of the base 51 extend upwards from the upper surface of the base 51 in FIG. 10. The space between the inner wall 52 and the tangs 54 defines a compartment for a flat, annular gasket 17, and the upper surface of the base 51 within the compartment defines a sealing surface 51b against which the gasket 17 can be compressed to form a fluid-tight seal. A plurality of circular ridges 53 project sharply upwards from the sealing surface 51b of the base 51 to increase the pressure and enhance the seal between the sealing surface 51b and the gasket 17.

Figure 13:
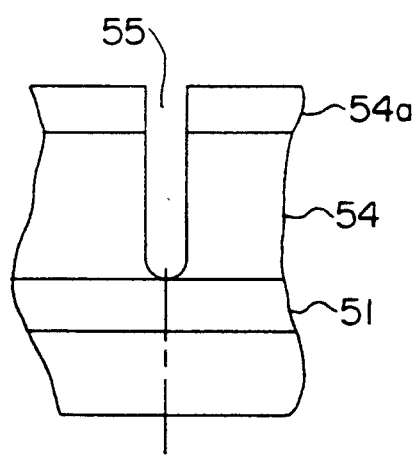
FIG. 13 is an enlarged view of a relief slot in the male end connector of FIG. 12.

As shown in FIG. 11, the tangs 54 extend circumferentially around the base 51 and are separated from one another by slits 55. As shown in FIG. 13, which is a side view of a portion of the male end connector 50, each slit 55 extends from the top of the tangs 54 down to the base 51. Each tang 54 has a wall portion extending upwards from the base and an overhanging flange 54a formed at the upper end of the wall portion and extending radially outward therefrom. The flange 54a serves as a latch member. The length of each tang 54 in the circumferential direction is not critical, but should be such as to permit the flange 54a of the tang 54 to deflect in the radial direction of the end connector 50. It is possible to employ a single tang 54 extending for 360 degrees without interruption around the base 51. However, the use of a plurality of tangs 54 separated by slits 55 permits the drainage of fluids that would otherwise accumulate between the mated end connectors 50, 60. In addition, a plurality of tangs 54 extending only partway around the base 51 generally has greater flexibility than a single uninterrupted tang extending entirely around the base 51, making it easier to engage and disengage the end connectors 50, 60. In the present embodiment, each tang 54 extends for approximately 177 degrees in the circumferential direction, and each slit 55 spans approximately 3 degrees.

The entire male end connector 50 is preferably an integral member and further functions as an end cap. It can be made of any material suitable for use as an end cap of a filter unit, such as a molded plastic. Unillustrated recesses can be formed in the bottom surface of the base 51 for receiving an end of the filter element 11 and the core 12 and a potting compound or an adhesive.

Figure 14:
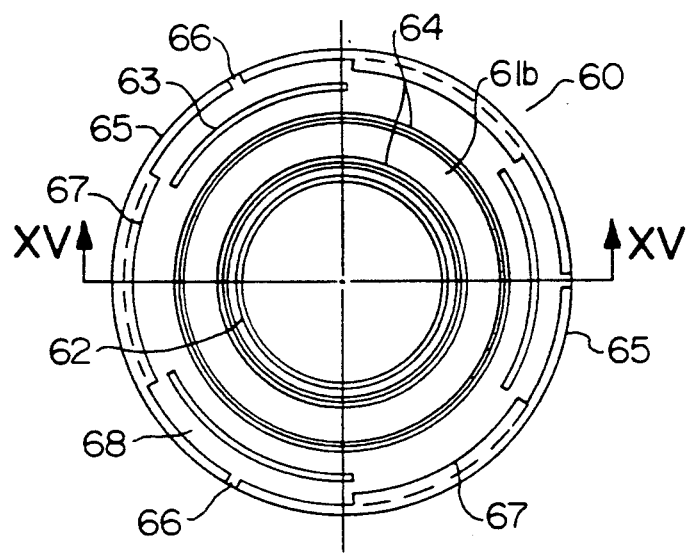
FIG. 14 is a plan view of the female end connector of FIG. 10.
Figure 15:
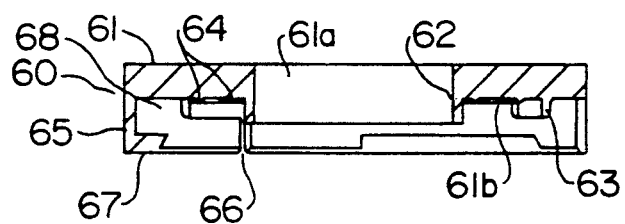
FIG. 15 is a cross-sectional view taken along Line XV—XV of FIG. 14.

FIG. 14 is a plan view and FIG. 15 is a cross-sectional view of the female end connector 60 of FIG. 10. Like the male end connector 50, the female end connector 60 has a disk-shaped base 61 having a hole 61a at its center that serves as a port for fluid flow. A cylindrical inner wall 62 surrounds the hole 61a and an intermediate wall 63 disposed radially outward from the inner wall 62 extend perpendicularly from the lower surface of the base 61 in FIG. 10 (the surface facing the male end connector 50). The space between the inner wall 62 and the intermediate wall 63 defines a compartment for a flat, annular gasket 17, and the surface of the base 61a in the compartment defines a sealing surface 61b against which the gasket 17 is compressed to form a fluid-tight seal. A plurality of circular ridges 64 project sharply from the sealing surface 61b of the base 61 to increase the pressure and enhance the seal between the sealing surface 61b and the gasket 17.

As shown in FIG. 14, the intermediate wall 63 is divided into a plurality of arcuate sections, each of which extends in the circumferential direction of the base 61 over an arc of a circle. In the present embodiment, each section spans approximately 60 degrees in the circumferential direction, but the exact dimensions and the number of sections in the intermediate wall 63 are not critical. The intermediate wall 63 can also comprise a single uninterrupted member extending for 360 degrees in the circumferential direction.

A cylindrical outer wall 65, which serves as the connecting portion of the female end connector 60, is formed on the bottom surface of the base 61 along its outer periphery. The outer wall 65 is preferably interrupted periodically by slits 66 which extend from the top of the outer wall 65 to the base 61. The slits 66 in the outer wall 65 serve the same purpose as the slits 55 in the tangs 54, allowing fluid drainage and increasing the flexibility of the outer wall 65. In the present embodiment the buter wall 65 is divided into three sections by the slits 65, the three sections collectively extending for approximately 354 degrees along the periphery of the base 61, and the slits 66 collectively spanning approximately 6 degrees. However, the circumferential length of each section of the outer wall 65 and the width of the slits 66 is not critical.

An overhanging flange 67 which projects radially inwardly from the outer wall 65 is formed on the upper end of the outer wall 65, preferably at intervals in the circumferential direction of the outer wall 65. Thus, the flange 67 has a generally arcuate configuration. The flange 67 serves as the latch member of the female end connector 60 for engagement with the flanges 54a of the tangs 54 of the male end connector 50, and the space defined by the outer wall 65 the intermediate wall 63 and the base 61 serves as a socket 68 for receiving the tangs 54. Each flange 67 extends over an arc of a circle in the circumferential direction of the outer wall 65. In the present embodiment, each flange 67 extends for approximately 60 degrees and is disposed in the gap between two sections of the intermediate wall 63, but the length and disposition of the flanges 67 can be varied.

Like the male end connector 50, the female end connector 60 is preferably an integral member and further functions as an end cap. Consequently, it can be formed of the same materials as the male end connector 50. Grooves for receiving an end of the filter element 11 and the perforated core 12 and a potting compound or adhesive can be formed in the top surface of the base 61 of the female end connector 60 in FIG. 15.

In a preferred mode of operation, the male and female end connectors 50, 60 are engaged by pressing them against one another, i.e., exerting an axial force until the tangs 54 on the male end connector 50 enter the socket 68 of the female end connector 60. The diameter at the inner periphery of the flanges 67 of the female end connector 60 is smaller than the diameter at the outer periphery of the flanges 54a of the male end connector 50. Therefore, in order to insert the tangs 54 into the socket 68, the tangs 54 of the male end connector 50 and/or the outer wall 65 of the female end connector 60 must bend enough in the radial direction for the flange 54a of the tangs 54 to slide past the flanges 67 of the outer wall 65 of the female end connector 60. To help guide the tangs 54 into the socket 68, the outer periphery of the flanges 54a of the tangs 54 and the inner periphery of the flanges 67 of the wall 65 are bevelled. Once the flanges 54a of the tangs 54 have slid past the flanges 67 of the outer wall 65, the tangs 54 and the outer wall 65 spring back to their original positions. The thickness of the walls of the tangs 54, the thickness of the outer wall 65, and the circumferential spacing of the slits 55, 66 are chosen so that the tangs 54 and/or the outer wall 65 can deflect radially by the required amount for engagement of the tangs 54 with the flanges 67 of the outer wall 67 without excessive stresses being exerted thereon.

Once the tangs 54 have been inserted into the socket 68 of the female end connector 60, the flanges 54a of the tangs 54 and the flanges 67 of the outer wall 65 overlap one another in the radial direction of the end connectors. As in the first embodiment, the components of the male and female end connectors 50, 60 may be designed to produce a snug fit or a loose fit, but in either case contact between the flanges 54a, 67 of the end connectors does not provide adequate sealing force to form a fluid-tight seal between the gaskets 17 or between the gaskets 17 and the sealing surfaces 51b, 61b. However, the amount of overlap of the flanges 54a, 67 is sufficient to prevent the two end connectors 50, 60 from becoming easily disconnected from one another. The flanges 54a, 67 are strong enough to support the weight of a plurality of filter units 10, so that when a plurality of filter units 10 are connected end to end by means of the end connectors 50, 60 to form a stack, the entire stack can be lifted by grasping the filter unit 10 at the upper end of the stack.

However, the tangs 54 of the male end connector 50 and the outer wall 65 and the flanges 67 of the female end connector 60 are sufficiently flexible that the two end connectors 50,60 can be disconnected from one another when desired by manually exerting a bending load on the connected filter units 10. The end connectors 50, 60 are preferably sufficiently durable to be disconnected without damage to the tangs 54 or the flanges 67 of the outer wall 65.

The socket 68 extends without obstructions for 360 degrees around the female end connector 60, so when the gaskets 17 are not under compression the male and female end connectors 50, 60 can be freely rotated with respect to one another. By allowing relative rotation of the end connectors it is possible to prevent damage to the end connectors if a torque should be applied to one filter unit 10 of the stack installation.

A fluid-tight seal between mated end connectors 50, 60 is attained by compression of the gaskets 17 against each other and against the sealing surfaces 51b, 61b of the end connectors 50 and 60. The compressive force is produced substantially entirely by a compression-generating member, e.g., the tie rod 15 and bolt 16 of FIG. 9. In preferred embodiments, substantially no compressive force is exerted by the two end connectors 50, 60. As in the first embodiment, a gap 19 may even develop between the flanges 54a, 67 when the compression-generating member presses the gaskets 17 in sealing contact with each other and with the sealing surfaces 51b and 61b.

The embodiment of FIGS. 9-15 provides advantages similar to those provided by the embodiment of FIGS. 1-8. In addition, the second embodiment provides the further benefit that mated end connectors can be rotated with respect to one another, so the possibility of breakage of the end connectors during installation is further reduced.

Although the present invention has been described with reference to two embodiments, other embodiments and modifications are within the scope of the invention. For example, in the above-described embodiments, both the male and female end connectors according to the present invention are used as the end caps of filter units 10. However, the end connectors can be independent of the end caps. For instance, in the embodiment of FIG. 1, the adaptor 14 for supporting the lower end of the stack of filter units 10 to the base 13 could be replaced by a male end connector secured to the base 13, and the lower end of the tie bolt 15 could be secured to this male connector by a nut.

Also, in the preceding embodiments, each filter unit 10 is equipped with one male end connector and one female end connector. However, it is possible to instead equip each filter unit with two end connectors of the same type, such as two male end connectors or two female end connectors. A plurality of such filter units can be connected in series such that filter units having two male end connectors alternate with filter units having two female end connectors.

What is claimed is:

1. A filter unit comprising:
a filter element having a generally cylindrical configuration and first and second ends;
first and second end connectors respectively positioned at the first and second ends of the filter element, each end connector including a sealing surface and a connecting portion having a latch member, wherein the latch members of the first and second end connectors overlap in a radial direction; and
a seal positioned at the sealing surface of at least one of the first ad second end connectors, whereby the first end connector is connectable to a second end connector of an identical filter unit by an engagement of the connecting portions of the end connectors in which the latch members overlap in the radial direction and the first and second end connectors are arranged such that contact between the latch members applies insufficient force on the seal to provide a fluid tight connection between the filter unit.

2. A first unit as claimed in claim 1 wherein the first end connector further includes a base, wherein the connecting portion of the first end connector comprises a tang which has a wall portion extending away from the base, and wherein the latch member of the first end connector comprises a flange which extends away from the wall portion.

3. A filter unit as claimed in claim 2 wherein the connecting portion of the second end connector comprises a plate having a slot for receiving the tang of the first end connector and wherein the latch member of the second end connector comprises a ledge of the plate adjacent to the slot.

4. A filter unit as claimed in claim 3 wherein the first end connector includes a plurality of tangs circumferentially spaced from one another, wherein the second end connector includes a plurality of slots correspondingly circumferentially spaced from one another, and wherein each slot comprises first and second circumferentially extending sections which communicate with one another, the first section having a width greater than the flange of the first end connector and the second section having a width less than the flange of the first end connector.

5. A filter unit as claimed in claim 2 wherein the second end connector further comprises a base, wherein the connecting portion of the second end connector comprises a wall extending away from the base, and wherein the latch member of the second end connector comprises a flange extending away the wall.

6. A filter unit as claimed in claim 5 wherein the wall has a generally cylindrical configuration and the flange has a generally arcuate configuration.

7. A filter unit as claimed in claim 6 wherein the wall comprises a plurality of sections and a plurality of slits separating the sections.

8. A filter unit as claimed in claim 1 wherein the first and second end connectors respectively comprise first and second end caps respectively sealed to he first and second ends of the filter element.

9. A filter unit as claimed in claim 1 wherein the first and second end connectors are integrally joined to the first and second ends of the filter element, respectively, and serve as end caps.

10. A filter unit as claimed in claim 1 wherein the seal comprises first and second seal members respectively positioned at the sealing surfaces of the first and second end connectors.

11. A filter system comprising:
a first filter unit having a first end connector which includes a first sealing surface and a first connecting portion having a first latch member;
a second filter unit having a second end connector which includes a second sealing surface and a second connecting portion having a second latch member, the second end connector being connected to the first end connector by an engagement of the connecting portions in which the latch members overlap in a radial direction;

a seal disposed between the sealing surfaces of the first and second end connectors, contact between the latch members of the first and second end connectors applying insufficient force against the seal to provide a fluid-tight connection between the filter units; and a compression-generating member coupled to the filer units and arranged to press the sealing surfaces of the first and second end connectors into sealing contact with the seal member.

12. A filter system as claimed in claim 11 wherein the overlapping latch members of the first and second connecting portions are separable by a gap when the sealing surfaces are in sealing contact with the seal member.

13. A filter system as claimed in claim 11 wherein the first and second connectors each include a base, wherein the first connecting portion is integrally formed with the first base. and wherein the second connecting portion is integrally formed with the second base.

14. A filter system as claimed in claim 11 wherein:
the first and second connecting portions each include a base;
the first connecting portion comprises a tang having a wall portion extending from the first base and the first latch member comprises a flange extending from the wall portion; and
the second connecting portion comprises a plate spaced from and connected to the second base and having a circumferentially extending slot for receiving the tang of the first connecting portion and the second latch member comprises a ledge of the plate adjacent tot he slot. the slot comprising a first section having a width greater than the flange of the tang and a second section adjoining the first section and having a width less than the flange of the tang.

15. A filter system as claimed in claim 14 further comprising means for providing resistance to movement by the tang between the first and second sections of the slot.

16. A filter system as claimed in claim 11 wherein:
the first and second connectors each include a base;
the first connecting portion comprises a tang having a wall portion extending from the first base and the first latch member comprises a flange extending from the wall portion;
the second connecting portion comprises a wall extending from the second base and the second latch member comprises a flange extending from the wall; and
at least one of the firs connecting portion and the second portion is deformable to permit the flange of the first connecting portion to slide past the flange of the second connecting portion.

17. A filter system as claimed in claim 11 wherein the seal member includes an annular gasket.

18. A filter system as claimed in claim 11 wherein the seal member comprises first and second seals mounted on the first and second sealing surfaces, respectively, the seals being separable by a gap when the latch members of the first and second connecting portions are in contact.

19. A filter system as claimed in claim 11 wherein each of the sealing surfaces has a projection formed thereon for increasing the sealing force between the sealing surface and the sealing member.

20. A filter system as claimed in claim 11 wherein the first and second end connectors comprise first and second end caps secured to the first and second filter units, respectively.

21. A filter system as claimed in claim 11 wherein each filter unit includes a filter element and each end connector is integrally joined to an end of the filter element and serves as an end cap.

22. A filter system as claimed in claim 11 wherein each of the end connectors has a central hole for the passage of fluid through the end connector, and the connecting portion of the end connector is disposed radially outward from the central hole.

23. A filter system as claimed in claim 22 wherein the compression-generating member comprises a tie rod which extends through the holes in the end connectors.

24. A filter system as claimed in claim 11 wherein the compression-generating member comprises a tie rod which extends along the first and second filter units.

25. A filter system as claimed in claim 24 wherein each filter unit has a hollow configuration and each end connector has a central hole and wherein the tie rod extends through the center of the filter units and end connectors.

* * * * *

UNITED STATES PATENT AND TRADEMARK OFFICE
CERTIFICATE OF CORRECTION

PATENT NO. : 5,141,637

DATED : August 25, 1992

INVENTOR(S) : Reed et al.

It is certified that error appears in the above-identified patent and that said Letters Patent is hereby corrected as shown below:

Title page, item [56], add the following:
--References Cited--

```
3,246,920   4/1966    Pall
542339      1/1942    United Kingdom
1031817     6/1966    United Kingdom
3816434     11/1988   Germany
```

Item no. 56, References Cited, Foreign Patent Documents, change "3921369  1/1990  Germany" to --3921369  1/1989  Germany--.

Claim 1, column 12, line 4, change "ad" to --and--.

Claim 2, column 12, line 14, change "first" to --filter--.

Claim 8, column 12, line 52, change "he" to --the--.

Claim 11, column 13, line 12, change "filer" to --filter--.

UNITED STATES PATENT AND TRADEMARK OFFICE
CERTIFICATE OF CORRECTION

PATENT NO. : 5,141,637
DATED : August 25, 1992
INVENTOR(S) : Reed et al

It is certified that error appears in the above-indentified patent and that said Letters Patent is hereby corrected as shown below:

Claim 14, column 13, line 38, change "tot he" to --to the--.

Claim 16, column 14, line 9, change "firs" to --first--.

Signed and Sealed this

Fourteenth Day of September, 1993

Attest:

BRUCE LEHMAN

Attesting Officer

Commissioner of Patents and Trademarks